United States Patent [19]
Cox et al.

[11] 3,740,892
[45] June 26, 1973

[54] LOBSTER TRAP

[75] Inventors: Norman D. Cox, Zionsville; Alexander G. P. McInnes, Indianapolis, both of Ind.

[73] Assignee: International Research and Development Corporation, Indianapolis, Ind.

[22] Filed: Feb. 16, 1972

[21] Appl. No.: 226,773

[52] U.S. Cl. ............................................. 43/100
[51] Int. Cl. ............................................. A01k 69/00
[58] Field of Search ........................ 43/100, 65, 66

[56] References Cited
UNITED STATES PATENTS

| | | | |
|---|---|---|---|
| 3,678,612 | 7/1972 | Hendrickson | 43/100 |
| 2,769,274 | 11/1956 | Ougland | 43/65 X |
| 764,085 | 7/1904 | Walton | 43/66 |

*Primary Examiner*—Louis G. Mancene
*Attorney*—David Emhardt

[57] ABSTRACT

A trap for catching lobsters. A rigid enclosure has a plurality of side wall entrance openings. A plurality of inclined ramps extend from each side wall opening towards the center of the enclosure. The inner ends of each ramp are spaced apart forming a lobster fall through hole which is covered by a collapsible floor. The collapsible floor includes a plurality of spring elements arranged in a sheet configuration and mounted in cantilevered fashion. A lobster entering the enclosure via a ramp will fall through the collapsible floor and become trapped. A door is hingedly mounted to one of the side walls to facilitate removal of the trapped lobster.

8 Claims, 9 Drawing Figures

3,740,892

LOBSTER TRAP

BACKGROUND OF THE INVENTION

1. Field of the Invention

This invention relates to traps for shellfish such as lobsters, crayfish and the like.

2. Description of the Prior Art

Two traditional types of lobster traps are the Parlor Trap and the Double Header Trap. In the Parlor Trap, the lobster must crawl through two separate entrance openings in order to arrive at the position of the bait bag. In the Double Header Trap, the lobster may enter the trap from either end by crawling through one of the entrance openings provided at the ends of the trap. In both traps, the entrance openings are provided with a head which includes a rigid hoop and woven netting produced from twine, nylon or plastic mounted on the hoop. Once the lobster is within the trap, the lobster is hindered from escape by reason of the location of the hoop opening.

A representative sample of the prior art is shown in the following U.S. Pats: No. 2,726,479 issued to Huse; No. 3,045,386 issued to Coyne; and, No. 3,271,894 issued to Manno et al. Another lobster trap which is used in England and is called the Leakey Pot includes a fine mesh plastic floor netting which is stiff and springy and which extends beyond the opening of the hoop netting and further into the trap.

SUMMARY OF THE INVENTION

One embodiment of the present invention is a lobster trap comprising a rigid enclosure with a first floor and having a side wall entrance opening for the lobster to enter, a rigid sheet with an outer end mounted to the enclosure and an inner end positioned within the enclosure above the first floor, the sheet extending from the opening into the enclosure for supporting the entering lobster, and collapsible floor mounted to the enclosure adjacent the sheet and extending beyond the inner end for the lobster to move from the sheet onto the collapsible floor and therefore to fall therethrough to the first floor.

It is an object of the present invention to provide a new and improved lobster trap.

It is the further object of the present invention to provide a lobster trap which has a relatively large parlor area.

It is yet another object of the present invention to provide a lobster trap which has relatively better means for preventing escape of the lobster as compared with prior art lobster traps.

Related objects and advantages of the present invention will be apparent in the following description.

DESCRIPTION OF THE PREFERRED EMBODIMENT

Figure 1:
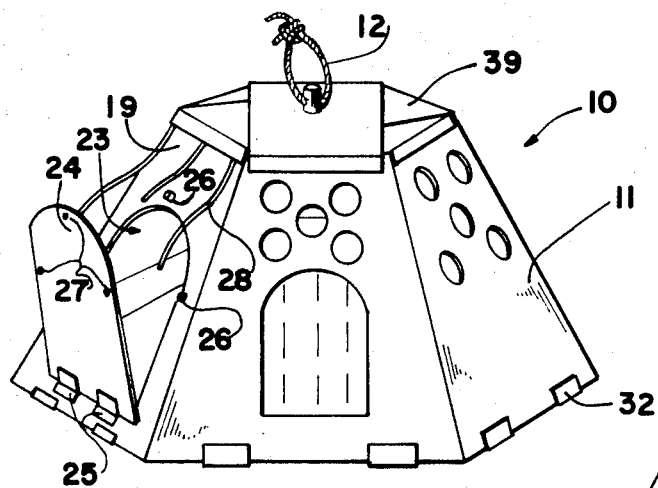
FIG. 1 is a perspective view of a lobster trap incorporating the present invention with the exit door shown partially open.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
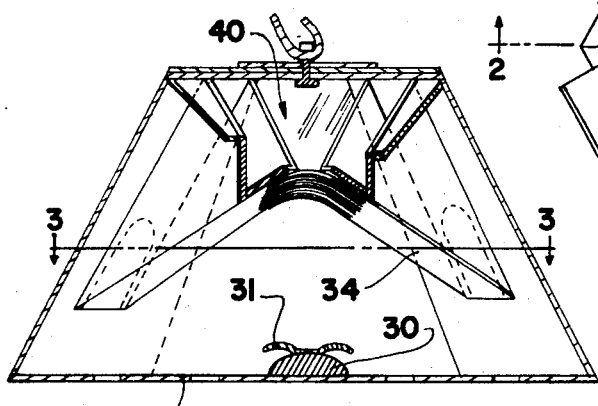
FIG. 2 is a cross sectional view of the lobster trap of FIG. 1 taken along the line 2—2 of FIG. 3 and viewed in the direction of the arrows.
Figure 4:
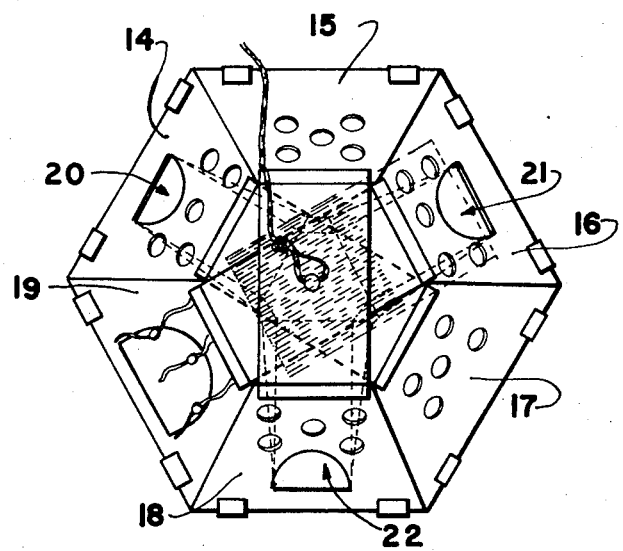
FIG. 4 is a top view of the lobster trap of FIG. 1.

Referring now more particularly to FIG. 1, there is shown a lobster trap 10 which has a truncated pyramidial configuratlon with a hexagonally shaped base. Attached to the enclosure body 11 is a wire or rope 12 for lowering and raising the trap in the water. The configuration of the trap facilitates the ease of removal from the water and minimizes the effect of wave action while the trap is resting on the bottom. Enclosure 11 is rigid and includes a rigid floor 13 (FIG. 2) which is mounted to the six side walls 14 through 19 (FIG. 4) which are connected together. Side walls 14, 16 and 18 are respectively provided with openings 20, 21 and 22 for the lobster to enter the trap. Side wall 19 is provided with an exit opening 23 (FIG 1) to facilitate the removal of a trapped lobster. Door 24 is hingedly mounted to side wall 19 by a pair of hinges 25. Upstanding bosses 26 are mounted to side wall 19 and project through holes 27 when the door is in the closed position thereby closing opening 23. Flexible rods or cords 28 have their top ends fixedly secured to the enclosure and may be extended downwardly through apertures in bosses 26 thereby locking door 24 closed as shown in FIG. 4. Hinges 25 may be secured to door 24 and side wall 19 by any number of standard fastening means such as rivets.

Figure 5:
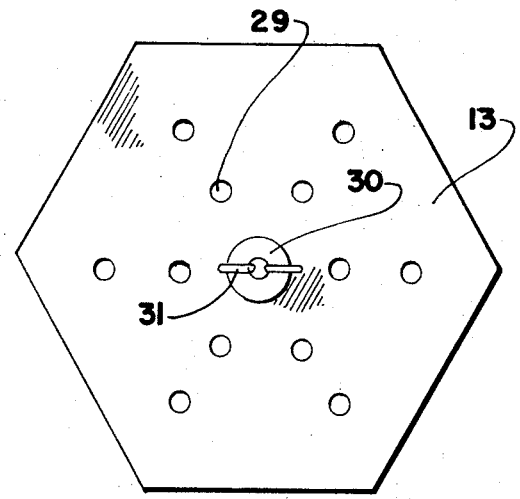
FIG. 5 is a top view of the floor removed from the trap of FIG. 1.

Floor 13 (FIG. 5) has a hexagonal outline and is provided with a plurality of apertures 29 through which water may pass into and out of the trap. A weight 30 is fixedly secured to the center of floor 13 to insure that the trap will sink to the bottom of the body of water. A hook 31 is fixedly mounted atop weight 30 for the mounting of a bait bag. Floor 13 abuts against the bottom surface of the side walls and is secured thereto by a plurality of straps 32 (FIG. 1) which are mounted to the side walls and extends around the edge of the side walls against the outer surface of floor 13. Snaps are utilized to secure straps 32 to floor 13 thereby allowing the quick and easy removal of straps 32 from floor 13 and the subsequent removal of the floor from the trap. By removing the floor completely from the trap, the trap may be readily cleaned. Likewise, by removing the floor, the trap may be stacked atop an identical trap with the bottom trap projecting up into the top trap.

Figure 8:
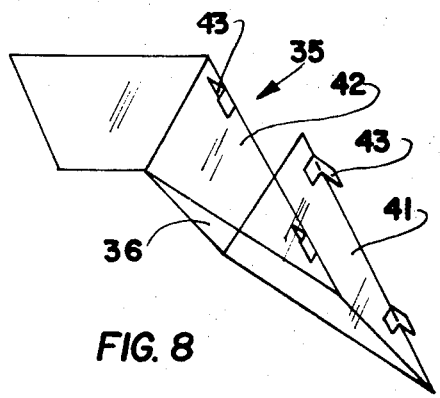
FIG. 8 is an enlarged perspective view of one of the ramps of FIG. 7.

Three inclined ramps 33, 34 and 35 (FIG. 3) are respectively mounted to side walls 14, 16 and 18 adjacent the entrance openings. Ramp 35 will now be described it being understood that a similar description applies to ramps 33 and 34. Ramp 35 includes a rigid sheet 36 having an outer end 37 mounted to the enclosure and an inner end portion 38 positioned within the enclosure above floor 13. Sheet 36 extends from opening 22 into the enclosure for supporting the entering lobster. The sheet is inclined upwardly from opening 22 towards the top wall 39 (FIG. 1) of the trap which is fixedly secured to the side walls. The three inclined ramps come together centrally within the enclosure forming a lobster fall through hole 40 (FIG. 3) which is covered by a collapsible floor to be described later in this specification. Each ramp includes upwardly turned side edge portions extending between the ends of the ramp allowing movement off of the ramp only via the ends. For example, sheet 36 includes the upwardly turned edge portions 41 and 42 which abut against the inside surface of side wall 18. FIG. 8 shows a perspective view of ramp 35 illustrating the mounting of right angle flanges 43 which secure the edge portions to the side wall of the enclosure. Rivets may be utilized to secure flanges 43 to the side edge portions of the ramp and the side wall of the enclosure.

Figure 7:
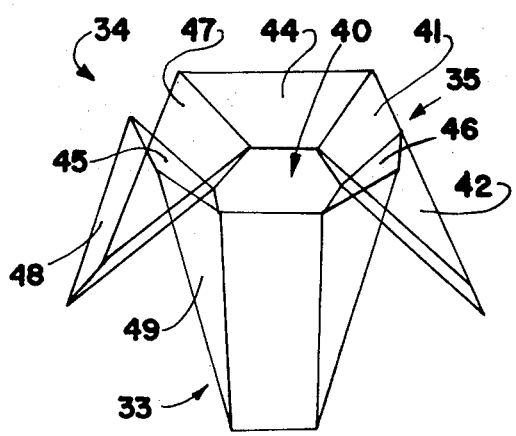
FIG. 7 is a perspective view of the ramps of the trap and removed therefrom.
Figure 6:
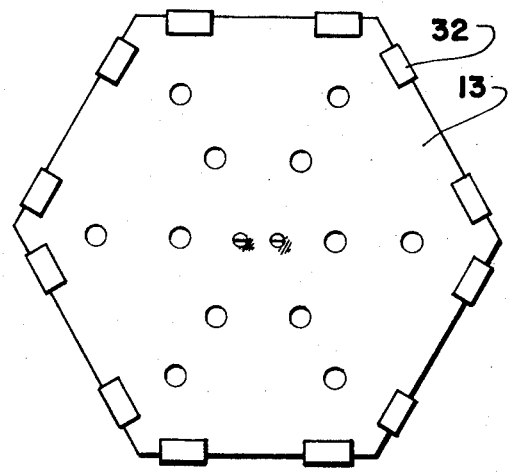
FIG. 6 is a bottom view of the trap of FIG. 1.

FIG. 7 is a perspective view of ramps 33 through 35 connected together illustrating that once the lobster is positioned on a ramp that he must exit the ramp either through the side wall entrance opening or down through hole 40. Walls 44 through 46 respectively connect the side edge portions of ramps 33 through 35 together with each wall 44 through 46 extending upward to the top of the trap. For example, wall 44 is connected to and extends between edge portion 41 of ramp 35 and edge portion 47 of ramp 34. Likewise, wall 45 is connected to and extends between edge portion 48 of ramp 34 and edge portion 49 of ramp 33. Walls 44 through 46 may be connected to the ramp edge portions by any number of standard means such as by rivets. Likewise, the side walls of the enclosure may be connected together as well as to the ramps by rivets.

Figure 3:
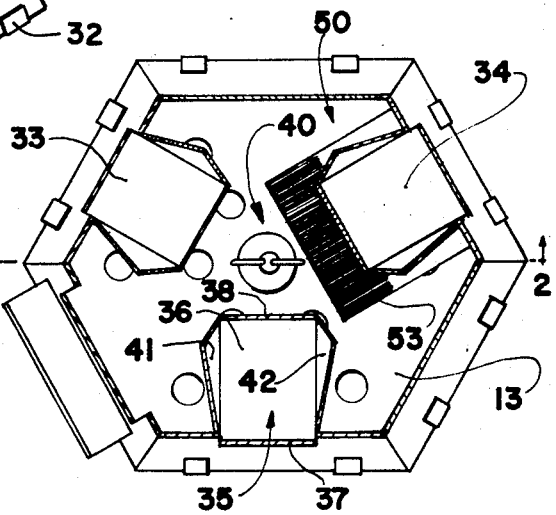
FIG. 3 is a plan view of the lobster trap of FIG. 1 taken along the line 3—3 of FIG. 2 and viewed in the direction of the arrows.
Figure 9:
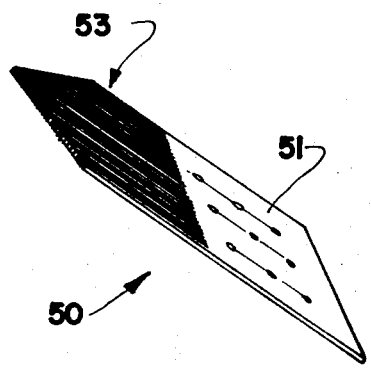
FIG. 9 is a perspective view of the collapsible floor which extends between he the of FIG. 7.

A collapsible floor is mounted to the enclosure adjacent one of the ramps and extends beyond the inner end of the ramp to which it is mounted. A lobster moving from the ramp onto the collapsible floor will thus fall through the collapsible floor to floor 13. Floor 50 (FIG. 9) includes a rigid sheet portion 51 having a plurality of cantileveredly mounted plastic spring elements 53 arranged in a flat sheet configuration which bend downwardly under the weight of a lobster. Floor 50 may be mounted to the bottom of any one of the three ramps. For illustration purposes, floor 50 is shown in FIG. 3 as having the solid portion 51 mounted beneath and immediately adjacent to ramp 34. Elements 53 then extend across hole 40 to the remaining two ramps. The inner ends of the ramps are positioned atop and contact the elements preventing upward movement of the elements above the ramps thereby preventing the lobster from escaping back out through hole 40. Elements 53 are clearly illustrated in FIG. 2 as extending from ramp 34 across hole 40 in a convexed configuration thereby extending beneath ramps 33 and 35.

The trap disclosed is significantly larger than the prior art traps thereby providing a larger parlor area for receiving the lobsters. The shape of the trap minimizes wave action while resting on the bottom and will permit nesting of the traps for storage and hauling. While a variety of materials may be utilized for producing the trap, excellent results have been obtained by making the trap from plastic providing for a durable and inexpensive trap.

The spring elements of the collapsible floor will bend downwardly when the lobster moves onto the collapsible floor and will return to their original position after the lobster has fallen to floor 13. The spring elements will therefore prevent the lobsters from escaping the trap. Losses therefore will be minimized. The larger parlor area will allow each lobster additional space thereby minimizing the normal damage of one lobster by another lobster.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A shellfish trap comprising:
   a rigid enclosure with a first floor and having a side wall entrance opening for the shellfish to enter;
   a rigid sheet with an outer end mounted to said enclosure and an inner end positioned within said enclosure above said first floor, said sheet extending from said opening into said enclosure for supporting the entering shellfish; and,
   a collapsible floor mounted to said enclosure adjacent said sheet and extending beyond said inner end for the shellfish to move from said sheet onto said collapsible floor and fall therethrough to said first floor.

2. The shellfish trap of claim 1 wherein:
   said sheet is an inclined ramp; and further comprising:
   a second inclined ramp mounted to said enclosure and extending into said enclosure from another side wall entrance opening, said second ramp having an inner end spaced apart from said inner end of said sheet with said collapsible floor extending from said inner end of said sheet to said inner end of said second ramp.

3. The shellfish trap of claim 2 wherein:
   said enclosure has a side wall exit opening for removal of a trapped shellfish; and further comprising:
   a door hingedly mounted to said enclosure closing said exit opening.

4. The shellfish trap of claim 3 wherein:
   said enclosure has a pyramidial configuration with a hexagonal base facilitating ease of removal of the trap from the water and minimizing the effect of wave action on the trap while the trap is on the ocean floor.

5. The trap of claim 1 wherein:
   said enclosure has side walls with fastening means mounted thereto securing said first floor to said side walls, said means are operable to provide removal of said first floor from the trap allowing the trap to be stacked atop an identical trap with the identical trap projecting upward into the enclosure.

6. The trap of claim 1 wherein:
   said collapsible floor includes a plurality of cantileveredly mounted plastic spring elements arranged in a flat sheet configuration which bend downwardly under the weight of a shellfish.

7. The trap of claim 6 wherein:

said sheet is a first inclined ramp and further comprising:

a plurality of inclined ramps mounted to said enclosure which come together with said first inclined ramp centrally within said enclosure forming a shellfish fall through hole covered by said collapsible floor, each ramp includes upwardly turned side edge portions extending between the ends of the ramp allowing movement off the ramp only via the ends.

8. The trap of claim 7 wherein:

said inner ends of said ramps are positioned atop and contact said elements preventing upward movement of said elements above said ramps thereby preventing the shellfish from escaping back out through the shellfish fall through hole.

* * * * *